United States Patent [19]
Baurand et al.

[11] Patent Number: 5,627,714
[45] Date of Patent: May 6, 1997

[54] ELECTRONIC THERMAL PROTECTION DEVICE

[75] Inventors: Gilles Baurand, Montesson; Antoine Stentz, Rueil Malmaison, both of France

[73] Assignee: Schneider Electric SA, Boulogne Billancourt, France

[21] Appl. No.: 399,599

[22] Filed: Mar. 7, 1995

[30] Foreign Application Priority Data

Mar. 7, 1994 [FR] France .................. 94 02698

[51] Int. Cl.$^6$ .................................................. H02H 3/18
[52] U.S. Cl. .................................... 361/85; 361/103
[58] Field of Search .................. 361/23–25, 76–79, 361/85, 87, 93, 102, 103, 106; 364/481, 483

[56] References Cited

U.S. PATENT DOCUMENTS 4,751,653  6/1988  Junk et al. ................ 364/481

FOREIGN PATENT DOCUMENTS

| 2117946 | 7/1972 | France . |
| 2641410 | 6/1990 | France . |
| 2657732 | 8/1991 | France . |
| 3320013 | 12/1984 | Germany . |

Primary Examiner—Jeffrey A. Gaffin
Assistant Examiner—Michael J. Sherry
Attorney, Agent, or Firm—Oblon, Spivak, McClelland, Maier & Neustadt, P.C.

[57] ABSTRACT

Electronic device for thermal protection of a load (M) by cutting off the polyphase power supply to said load, including current transformers ($Ti_1$, $Ti_2$, $Ti_3$) installed on the wires ($L_1$, $L_2$, $L_3$) of the polyphase line supplying power to said load and connected to an electronic processor circuit (3) adapted to generate a command, characterized in that the outputs of the current transformers ($Ti_1$, $Ti_2$, $Ti_3$) are connected to detector means (51, 52, 53) which supply to the processor circuit (3) logic signals the levels of which depend on the direction or the magnitude of the output current of each current transformer.

5 Claims, 2 Drawing Sheets

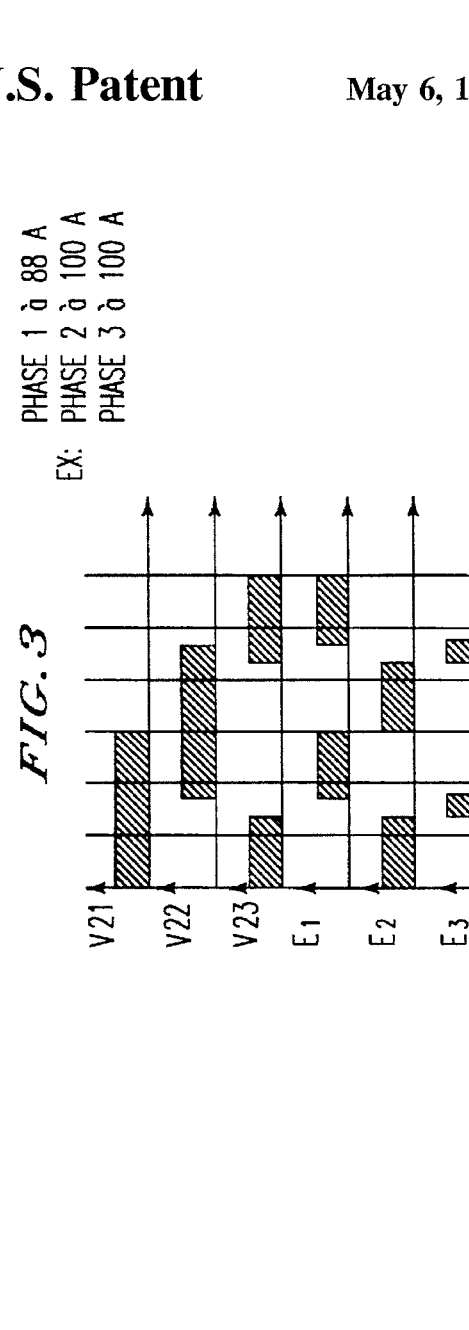
FIG.3
FIG.2
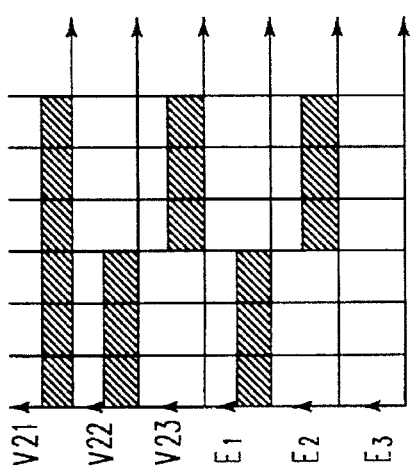
FIG.4

ELECTRONIC THERMAL PROTECTION DEVICE

BACKGROUND OF THE INVENTION

1. Field of the Invention

The present invention concerns an electronic device for thermal protection of a load comprising current transformers installed on the polyphase line wires supplying power to said load and connected to an electronic processor circuit generating a command to interrupt the polyphase power supply to said load.

2. Discussion of the Background

Electric motors are protected by overload relays associated with contactors or thermal protection relays associated with circuit-breakers. These devices monitor the current drawn on each phase and sense absence of any phase or imbalance between phases. They usually include a bimetal strip for each phase heated by the phase current. If an overload occurs on a phase the bimetal strip for the overloaded phase bends and commands disconnection of the power supply to the motor. A differential device commands tripping in response to absence of a phase or to an imbalance between phases.

Overload relays are difficult to use for currents exceeding around 100 amperes. The heating of each bimetal strip and therefore the tripping current are not accurately controlled because of unwanted heating that occurs.

Electric motors are also protected by electronic relays such as that described in French patent 2 586 489. A relay of this kind includes a current sensor for each phase producing an image of the phase current. An electronic processor circuit receives and processes the phase current images and generates a tripping command in response to an overload or an imbalance between phases.

French patent 2 641 410 describes an electronic relay fitted with a heat detector including a resistive heater element through which a phase current flows and which is thermally coupled to a temperature sensor by means of a thermal coupling body. This heat detector provides a simple way of storing the thermal status of the load protected by the relay.

SUMMARY OF THE INVENTION

One object of the invention is to provide an electronic protection device processing phase imbalances with no analog processing. The device is not sensitive to harmonics. It detects current imbalances, however great or small, and absence of phases.

The device of the invention is characterized in that outputs of the current transformers are connected to detector means which supply to the processor circuit logic signals the levels of which depend on the direction or the magnitude of the output current of each current transformer.

In accordance with one feature of the invention the electronic processor circuit processes the signals received and has an output circuit which generates a tripping or other command to an associated device.

In accordance with one feature of the invention the electronic processor circuit (3) processes the logic signals to combine logic states by means of an "exclusive-OR" operator and to calculate if the times during which these logic states are at the same level are equal or unequal.

BRIEF DESCRIPTION OF THE DRAWINGS

The invention will now be described in more detail, by way of example only and with reference to the embodiment shown in the accompanying drawings, in which:

FIG. 2 is a diagram illustrating the operation of the FIG. 1 device under balanced conditions;

FIG. 3 is a diagram showing its operation under unbalanced conditions;

FIG. 4 is a diagram showing its operation when a phase is absent.

DESCRIPTION OF THE PREFERRED EMBODIMENT

Figure 1:
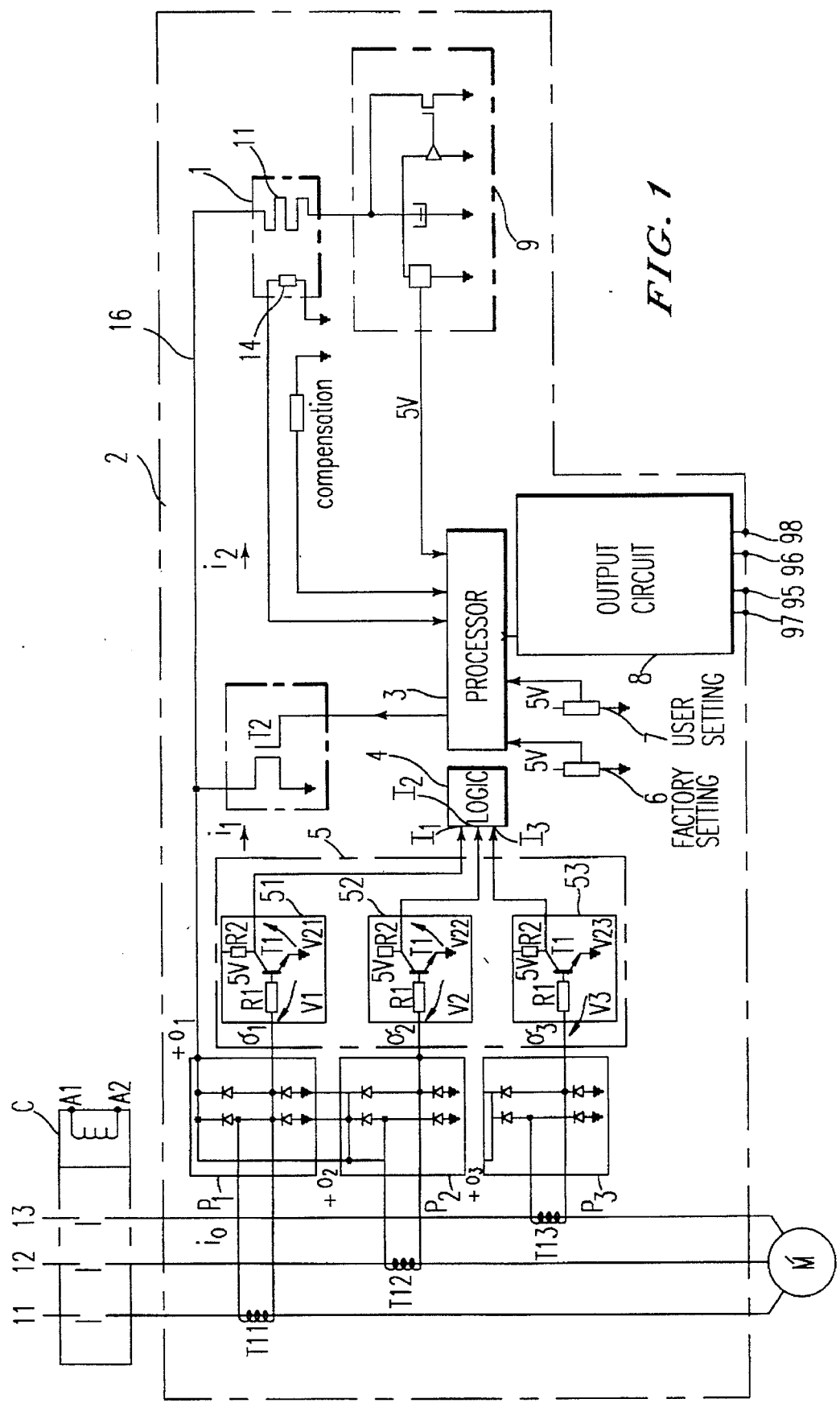
FIG. 1 is a schematic of a three-phase electronic protection device of the invention.

The electronic device of the invention is adapted to protect a three-phase electric motor M against overloads or imbalances between phase currents.

A respective current transformer type current sensor $Ti_1$, $Ti_2$, $Ti_3$ is provided on each phase wire $L_1$, $L_2$, $L_3$. The secondary outputs of the transformers $Ti_1$, $Ti_2$, $Ti_3$ feed a respective rectifier circuit $P_1$, $P2_2$, $P_3$ comprising a diode bridge $D_1$, $D_2$, $D_3$, $D_4$ and which supplies a rectified current to a respective pair of outputs $O_1$, $O'_1$; $O_2$, $O'_2$; $O_3$, $O'_3$.

The outputs $O_1$, $O_2$, $O_3$ of the rectifier circuits $P_1$, $P_2$, $P_3$ are connected together to a resistive heater element (resistor) 11 of a heat detector 1. A first end of the resistor 11 is therefore connected to the outputs $O_1$, $O_2$, $O_3$. The other end of the resistor 11 is connected to a power supply circuit 9. The rectified current produced by the rectifier circuits therefore flows through the resistor 11.

The power supply circuit 9 which is connected to the resistor 11 produces all output voltage (5 V) supplying an electronic processor circuit 3.

The resistor 11 is thermally coupled to a single temperature sensor 14 of a type that is known in itself. A thermal coupling plate made from a heat-resistant and electrically insulative material separates the temperature sensor 14 from the resistor 11.

The resistor 11 is preferably silkscreened onto the thermal coupling plate. The temperature sensor 14 can also be silkscreened onto the thermal coupling plate, on the side opposite that carrying the resistor 11. Alternatively, the sensor 14 can be independent of the coupling plate, but in direct contact with it.

The resistor 11, the thermal coupling plate and the temperature sensor 14 are accommodated in an electrically insulative casing.

The output signal of the sensor 14 is sent to the electronic processor circuit 3 which processes the signals it receives and has an output circuit 8 generating a tripping or other command to an associated device. The circuit 3 includes a microprocessor.

The electronic processor circuit 3 receives at a first input the information supplied by a factory set adjuster unit 6 and on a second input the information supplied by a user set adjuster unit 7.

The device can be associated with a contactor or with a circuit-breaker.

If the device is associated with a contactor (relay version), the output circuit 8 has outputs 95 through 98 which can be connected to the input A1, A2 of an associated contactor C installed on the lines $L_1$, $L_2$, $L_3$ so that it can cut off the power supply to the motor M.

If the device is associated with a circuit-breaker the output circuit 8 controls the tripping mechanism of the circuit-breaker.

The output current of the rectifier circuits $P_1$, $P_2$, $P_3$ is varied by a pulse width modulator transistor T2 under the control of the electronic processor circuit 3.

Each negative output of the rectifier circuits P1, P2, P3 drives a respective detector circuit 51, 52, 53 which converts the sinusoidal signal into a logic signal.

Each detector circuit 51 includes a resistor R1 connected to the output of a rectifier circuit and an NPN transistor T1 whose collector receives a supply voltage via a resistor R2 and whose emitter is connected to ground. The detector circuits 51, 52, 53 are all identical and all operate in the manner just described. Together they constitute the imbalance processor circuit 5.

How the device works will now be described.

The secondary currents of the current transformers $Ti_1$, $Ti_2$, $Ti_3$ are rectified and added to form a current $i_1$ which flows through the resistor 11. A rectified current which represents the sum of the rectified currents thus flows through the resistor 11 of the heat detector 1.

Depending on the current fixed by the user set adjuster unit 7, the electronic processor circuit 3 controls the pulse width modulator (PWH) transistor $T_2$ in such a way that the power dissipated in the heat detector 1 is substantially constant. Whatever the value to which the current is set, the heat detector 1 always operates at the same power. Heating is reduced if iR =$iR_{max}$. The technology of the heat detector is more economic. There is only one hot adjustment.

Referring to the detector circuits, the base-emitter voltage of the transistor $T_1$ is respectively $V_1$ for circuit 51, $V_2$ for circuit 52 and $V_3$ for circuit 53. The collector-emitter voltage of the transistor $T_1$ is respectively $V_{21}$ for circuit 51, $V_{22}$ for circuit 52 and $V_{23}$ for circuit 53.

When the secondary current $i_0$ of a current transformer Ti is positive the diodes $D_1$ and $D_4$ conduct. Regardless of the state of the transistors $T_2$ and $T_3$, the base-emitter voltage ViA is about 0.6 V. The transistor T1 is on and the collector-emitter voltage $V_{21}$ is a null voltage (0 V).

When the secondary current $i_0$ of the current transformer Ti is negative or zero, the diodes $D_2$ and $D_3$ conduct. Regardless of the state of the transistors $T_2$ and $T_3$, the base-emitter voltage $V_1$ is equal to –0.6 V. The transistor T1 is off and the collector-emitter voltage $V_{21}$ is equal to the nominal supply voltage of the transistor T1 (5 V).

The output voltages (emitter-collector voltages) $V_{21}$, $V_{22}$, $V_{23}$ are logic signals (either 0 V or 5 V). The signals $V_{21}$, $V_{22}$, $V_{23}$ which respectively correspond to the three phases are applied to the three inputs $I_1$, $I_2$, the logic circuit 4.

The logic circuit 4 processes the; logic signals $V_{21}$, $V_{22}$, $V_{23}$ to obtain an "exclusive-OR" combination of the logic states $E_1$, $E_2$, $E_3$ defined as follows:

$E_1$=1 if $V_{21}$ and $V_{22}$ are equal or $E_1$=0 if they are not equal;

$E_2$=1 if $V_{22}$ and $V_{23}$ are equal or $E_2$=0 if they are not equal;

$E_3$=1 if $V_{21}$ and $V_{23}$ are equal or $E_3$=0 if they are not equal.

If the times for which $E_1$, $E_2$ and $E_3$ are equal to 1 are equal during one period of the AC line voltage, then operation is balanced (FIG. 2).

If the times for which $E_1$, $E_2$ and $E_3$ are equal to 1 are not equal during one period of the AC line voltage, then operation is unbalanced (FIG. 3). In this case it is possible to determine the degree of imbalance of the primary currents.

If one of the phases is totally absent, one of the states $E_1$, $E_2$, $E_3$ is a null state during the time in question. If phase 1 is absent, for example, $V_{21}$=5 V at all times with the result that $E_3$=0 (FIG. 4).

The logic circuit 4 determines the states $E_1$, $E_2$, $E_3$. The calculation is performed over a time which is sufficiently long relative to the period of the AC line voltage. Processor circuit 3 receives the output of the logic circuit.

Tripping is commanded if the output signal of the sensor 14 exceeds a tripping threshold $S_{sup}$ for balanced operating conditions.

For unbalanced operating conditions the tripping threshold is modified by a coefficient K less than 1, yielding a new threshold $S_{inf}$.

The speed with which the threshold is reduced from $S_{sup}$ to $S_{inf}$ depends on the time constant of the heat detector 1.

If the unbalance is corrected, the threshold is progressively increased from $S_{inf}$ to $S_{sup}$.

If the imbalance is severe, i the electronic processor circuit 3 generates a tiripping command independently of the heat detector 1 after a fixed time-delay.

The device treats small unbalances "thermally", i.e. differentially like bimetal strip relays. It treats serious imbalances or absence of phases (hazardous operating conditions) using a fixed time-delay.

Variants of the invention as described, improvements of detail thereto and even the use of means equivalent to those described can be envisaged without this departing from the scope of the invention.

We claim:

1. A thermal protection device for an electric load connected to a polyphase power supply, comprising:
    a plurality of current transformers, each installed on one line of said polyphase power supply;
    detector means connected to said transformers for supplying logic signals having levels which depend on the direction and magnitude of currents from said transformers;
    a processor receiving and combining said logic signals to determine if each logic signal is equal to another logic signal and to determine an unbalance of the primary currents, wherein the processor processes logic signals by means of an operation so as to determine logic states each equal to a first level if a pair of logic signals are equal and to a second level if said pair of logic signals are not equal and to determine the times for which said logic states are at the same level are equal or unequal during a period in order to determine balance or unbalance of the primary currents; and
    an output circuit connected to said processor for removing the power supply from said load.

2. A thermal protection device according to claim 1, wherein said current transformers are connected to said detector means through rectifier circuits.

3. A thermal protection device according to claim 2, wherein said rectifier circuits are connected to a resistor of a heat detector, said resistor being thermally coupled to a temperature sensor connected to said processor.

4. A thermal protection device for an electric load connected to a polyphase power supply, comprising:
    a plurality of current transformers, each installed on one line of said polyphase power supply;
    detector means connected to said transformers for supplying logic signals having levels which depend on the direction and magnitude of currents from said transformers;

a processor receiving and combining said logic signals to determine if each logic signal is equal to another logic signal and to determine an unbalance of the primary current; and an output circuit connected to said processor for removing the power supply from said load;

wherein said detector circuits include transistors each having a base connected to an output of one of said transformers and a collector connected to an input of said processor.

5. A thermal protection device for an electric load connected to a polyphase power supply, comprising:

a plurality of current transformers, each installed on one line of said polyphase power supply;

rectifier means for rectifying the output of said current transformers;

detector means connected to said rectifier means for supplying logic signals having levels which depend on the direction and magnitude of currents from said transformers;

a processor receiving and combining said logic signals in order to determine if each logic signal is equal to another logic signal and for determining a trip condition;

a heat detector having a resistor with one end connected to said rectifier means and another end connected to a power supply circuit, said resistor being thermally coupled to a temperature sensor connected to said processor;

a pulse width modulator transistor connected to said rectifier means and being controlled by said processor so that the power dissipated in the heat detector is substantially constant; and an output circuit connected to said processor for removing the power supply from said load.

\* \* \* \* \*